Patented June 22, 1948

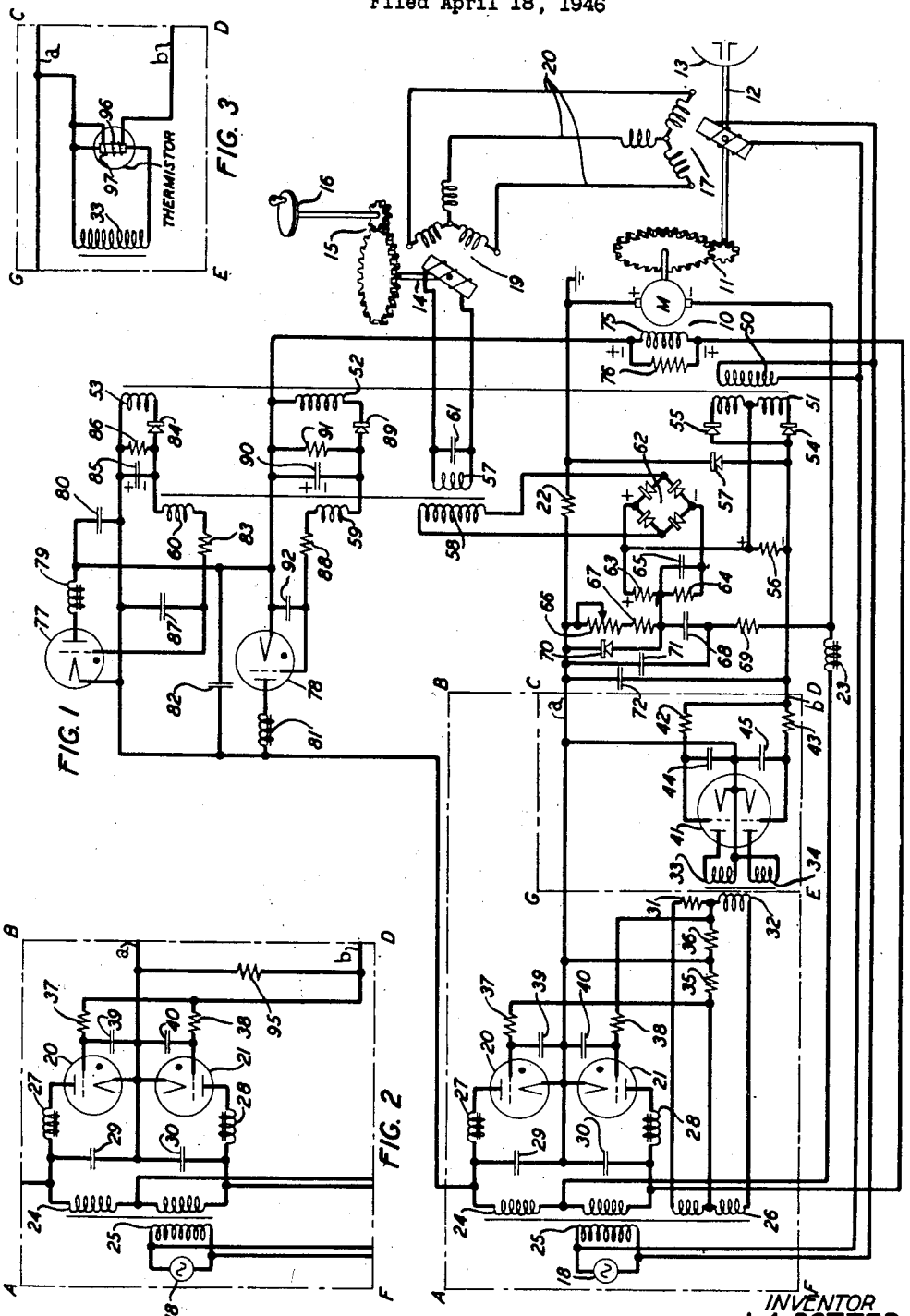

2,443,639

UNITED STATES PATENT OFFICE 2,443,639

REMOTE-CONTROL APPARATUS

James A. Potter, Rutherford, N. J., assignor to Bell Telephone Laboratories, Incorporated, New York, N. Y., a corporation of New York Application April 18, 1946, Serial No. 662,957

14 Claims. (Cl. 318—30)

This invention relates to remote control apparatus and particularly to apparatus for controlling the energization of an electric motor to control the movement of an output shaft driven by the motor.

An object of the invention is to provide an improved arrangement for controlling the energization of a motor in response to a control signal.

Another object is to provide an improved servomotor system for causing a motor driven output shaft to accurately follow displacement of an input or control shaft.

A further object of the invention is to provide means for controlling the rate of change of space current in a space current device in accordance with the direction of change of space current.

In a specific embodiment of the invention herein shown and described for the purpose of illustration, there is provided a circuit for controlling the energization of a direct current motor which drives an output shaft under control of an error signal which may change in phase and in magnitude in accordance with the relative displacement of the output shaft with respect to that of a manually rotatable input shaft. The direction of rotation of the driven or output shaft is determined by the direction of current flow through the motor field winding which in turn is controlled by the direction of displacement of the input shaft, the phase of the error signal being changed in response to a change of direction of the input shaft displacement. Two single phase rectifiers are provided for alternatively causing current to flow in different directions, respectively, through the motor field winding, the rectifiers being made operative for rectifying alternating current selectively in accordance with the phase of the error signal.

A full wave rectifier is provided for supplying unidirectional current to the motor armature to cause the motor to drive the output shaft. The full wave rectifier employs two gas-filled, three-electrode space current devices upon the control electrode-cathode circuit of each of which is impressed an alternating voltage the phase of which is varied for controlling the average space current in the rectifier tubes and thereby controlling the energization of the motor armature. The phase of the electromotive force applied to the control electrode-cathode circuit of each tube of the armature current rectifier is controlled by a phase shifting circuit including the primary winding of a transformer, the impedance of which is varied in accordance with the amplitude of the unidirectional current supplied to the secondary transformer winding. A fourth rectifier comprising two triode space current devices rectifies the current flowing in the secondary transformer winding, the amplitude of the rectified current being varied under control of an electromotive force impressed upon the control electrode-cathode circuits of the triodes.

The error signal is produced by a synchrogenerator the rotor of which is driven by the output shaft and a synchro-transformer the rotor of which is driven by the input or hand-wheel shaft. The error signal is rectified and impressed upon a circuit for setting up a control voltage having a component proportional to the error signal and a second component proportional to the rate of change of error signal. This control voltage is impressed upon the control electrode-cathode circuit of the fourth rectifier. Due to the inertia of the motor armature and the load driven by the output shaft, the motor has a tendency to hunt, that is, the output shaft has a natural tendency to lag the input shaft for an increasing rate of change of input shaft displacement and to lead the input shaft for a decreasing rate of change of input shaft displacement. If only the component proportional to the error signal were utilized the inertia of the motor armature would cause the output shaft to lag the input shaft in starting the displacement of the input shaft and the inertia would cause the displacement of the output shaft to increase beyond the displacement of the input shaft when the displacement of the input shaft is stopped. The component of the control voltage which is proportional to the rate of change of error signal has the effect of increasing the energization of the motor armature in response to increased rate of displacement of the input shaft and of decreasing the energization of the motor armature in response to a decreased rate of displacement of the input shaft thus tending to prevent hunting. A third component of the control voltage is proportional to the rate of change of armature voltage, the circuit for producing this component voltage being so designed that for a certain rate of change of armature voltage the third voltage component is much larger when the armature voltage is increasing than it is when the armature voltage is decreasing. The third component of the control voltage has the effect of limiting the rate of increase of armature voltage and thus preventing too large a momentum of the motor armature when the error signal is small. Overshooting of the output shaft or hunting is thus further minimized. The third component voltage being relatively small when the armature voltage is decreasing, it does not prevent a rapid decrease in motor speed in response to a decreasing error signal.

The invention will now be described with reference to the accompanying drawing in which:

Fig. 1 is a schematic view of a motor control system embodying the invention;

Fig. 2 is a schematic view of a modification of a portion of the system shown in Fig. 1; and Fig. 3 is a schematic view of an alternative modification of a portion of Fig. 1.

As shown in Fig. 1 of the drawing there is provided a direct current motor 10 for driving through gearing 11 an output shaft 12 to which is coupled a load to be driven, such as the antenna 13. The motor is energized in response to displacement of an input shaft 14 which may be driven in either direction through gearing 15 by means of a handwheel 16. There is provided a synchro-generator 17, the rotor of which is coupled to the output shaft 12 and the rotor winding of which is energized by current from a 60-cycle alternating current supply source 18. The stator windings of the synchro-generator 17 are connected to the stator windings of a synchro-transformer 19 by a three-conductor line 20 the rotor of the synchro-transformer being coupled to the input shaft 14. Angular displacement of input shaft 14 and of the synchro-transformer rotor-coupled thereto causes to be induced in the rotor winding of synchro-transformer 19 an alternating voltage or so-called error signal, the amplitude of which is proportional to the relative displacement of input shaft 14 with respect to output shaft 12 and the phase of which is dependent upon the direction of the displacement.

The production of an error signal in response to rotation of input shaft 14 causes rectified current from a full rectifier comprising three-electrode gas-filled tubes 20 and 21 to be supplied to the armature of motor 10 through a circuit comprising a series resistor 22 of 0.31 ohm in the lead connecting the cathodes of tubes 20 and 21 to the motor armature and a series choke coil 23 in a lead connecting the mid-tap of a secondary winding 24 of a transformer to the motor armature. The choke coil 23 is preferably a so-called "swinging" choke of the type described in a United States application of A. Majlinger and B. E. Stevens, Serial No. 466,856, filed November 25, 1942, now Patent No. 2,400,559, dated May 21, 1946. The tubes 20 and 21 may be of the JAN-C6J type. The transformer which has the secondary winding 24 has a primary winding 25 connected to the alternating current supply source 18 and a tertiary winding 26. One end terminal of transformer winding 24 is connected through an inductance element 27 to the anode of tube 20 and the other end terminal of winding 24 is connected through an inductance element 28 to the anode of tube 21. A 0.01-microfarad condenser 29 is provided in a path connecting the common terminal of transformer winding 24 and inductance element 27 to the cathode of tube 20 and a similar condenser 30 is provided in a path connecting the common terminal of winding 24 and inductance element 28 to the cathode of tube 21.

The average space current flowing in each of the tubes 20 and 21 and, therefore, the current supplied to the motor armature is controlled in accordance with the phase relationship of the voltage impressed upon the control electrode-cathode path of each tube with respect to the anode-cathode voltage. The grid-cathode voltage of tubes 20 and 21 is derived from transformer winding 26 and its phase is controlled by means of a phase shift bridge circuit comprising the two halves of transformer winding 26, a 22,000-ohm resistor 31, the primary winding 32 of a transformer having secondary windings 33 and 34 and a circuit path comprising 0.1-megohm resistors 35 and 36 in series connecting the mid-tap of transformer winding 26 to the common terminal of resistor 31 and transformer winding 32. The common terminal of resistors 35 and 36 is connected to the cathodes of tubes 20 and 21, the other terminal of resistor 35 being connected through 10,000-ohm resistor 37 to the control grid of tube 20 and the other terminal of resistor 36 being connected through 10,000-ohm resistor 38 to the control grid of tube 21. A 0.0068-microfarad condenser 39 connects the control grid and cathode of tube 20 and a similar condenser 40 connects the control grid and cathode of tube 21. The control grid-cathode voltages applied to tubes 20 and 21, respectively, are thus 180 degrees out of phase with respect to each other as are also the respective anode-cathode voltages.

The phase of the grid-cathode voltage of each of tubes 20 and 21 varies in response to impedance changes of transformer winding 32. The secondary transformer winding 33 is connected in the anode-cathode circuit of one of the triodes of a twin triode tube 41 while the secondary winding 34 is connected to the anode-cathode circuit of the other triode. Tube 41 may be of the JAN-6SL7 type. The cathodes of tubes 41 are connected to a lead $a$ going to the cathodes of tubes 20 and 21. The control grids of tube 41 are connected through 0.1-megohm resistors 42 and 43, respectively, to a lead $b$. The control grid and cathode of the respective triodes of tubes 41 are connected by 0.0068-microfarad condensers 44 and 45. Making the control grids of tube 41 relatively less negative with respect to the cathodes, causes the currents flowing in windings 33 and 34 to increase the impedance of winding 32 of the phase shifting circuit being reduced.

There will now be described the arrangement for setting up a control voltage which is impressed on the control electrode-cathode circuit of each of the triodes of tube 41 to control the impedance of winding 32. There is provided a transformer having a primary winding 50 connected to the alternating current supply source 18 and secondary windings 51, 52 and 53. A rectifier comprising asymmetrically conducting elements or varistors 54 and 55, rectifies the current from winding 51 and the rectified current is supplied to a resistor 56 one terminal of which is connected to lead $b$ going to the control electrodes of tube 41. Lead $b$ is also connected through a varistor 57 to the common terminal of resistor 22 and a grounded terminal of the armature of motor 10. Varistors are described in an article by J. A. Becker on page 322, et seq. of "Bell Laboratories Record" for July 1940. There is provided a second transformer having a primary winding 57 connected to the rotor winding of synchro-transformer 19 and secondary windings 58, 59 and 60, a 0.2-microfarad condenser 61 being connected across winding 57. A rectifier 62 of the varistor bridge type rectifies current from secondary winding 58 and the rectified current is supplied to resistors 63 and 64, each of 100,000 ohms, in series, resistor 64 being shunted by 4-microfarad condenser 65. A shunt path is connected across the portion of the motor armature circuit comprising the motor armature and resistor 22 in series, said shunt path comprising 500,000-ohm variable resistor 66, 4,700-ohm resistor 67, 1-microfarad condenser 68 and 500-ohm resistor 69. The common terminal of resistor 67 and condenser 68 is connected to the common terminal of resistors 63 and 64. A varistor 70 is connected across the circuit portion comprising variable resistor 66 and resistor 67 in series. A 4-microfarad condenser 71 is connected across the circuit portion comprising in series variable resistor 66, resistor 67 and condenser 68. A 1-microfarad condenser 72 is provided in a path connecting leads a and b.

The control electrode-cathode circuit of the triodes of tube 41 may be traced from the control electrodes through resistors 42 and 43, respectively, through resistor 56, through resistor 63 and through resistors 67 and 66, resistors 66 and 67 being shunted by a varistor 70. The effective voltage in the control grid-cathode circuit of tube 41 has four components. One of the components is a substantially constant electromotive force set up across resistor 56 due to the current supplied thereto from rectifier 54, 55. The second and third components are produced across resistor 63, the second component being proportional to the error signal which in turn is proportional to the displacement of the input shaft 14 relative to the output shaft 12 and the third component being proportional to the rate of change of error signal. This third component is due to the charging current of condenser 65 flowing through resistor 63 when the error signal is increasing and to the discharge of condenser 65 through resistor 64 when the error signal is decreasing. To illustrate the functioning of the circuit, consider that the error signal increases abruptly from one value to another. At the first instant, the entire increase of output voltage of rectifier 62 will be added to the original voltage across resistor 63 and as the condenser 65 charges, the voltage across resistor 63 will decrease until the voltages across resistors 63 and 64 are equal. A transient voltage increase across resistor 63 is thus added to the voltage which is proportional to the error signal. Similarly, when the error signal abruptly decreases, the entire decrease in output voltage of rectifier 62 appears across resistor 63 at the first instant thus giving rise to a transient voltage decrease across resistor 63 added to the voltage which is proportional to the error signal. The energization of the motor armature is thus quickly changed in response to a displacement of the input shaft 14, thus causing the lag of the output shaft 12 in following displacement of the input shaft to be minimized.

If no further control voltage component were introduced in the grid-cathode circuit of tube 41, there would exist the possibility of so greatly increasing the energization of the motor armature in response to an increase of displacement of input shaft 14 relative to the output shaft 12 that the output shaft would be caused to be displaced by a greater amount than the input shaft displacement, thus giving rise to an error signal of opposite phase and a consequent hunting action. This possibility is prevented by introducing into the grid-cathode circuit of tube 41 a fourth voltage component proportional to the rate of change of voltage across the motor armature and opposed to the third voltage component produced across resistor 63. Means are provided for limiting the fourth control voltage component to a small amplitude when the armature voltage is decreasing so that this voltage component is ineffective to prevent rapid deceleration of the motor when the error signal is decreasing. The fourth control voltage component is produced across rheostat 66 and resistor 67 in series due to the charging current of condenser 68 flowing therethrough when the voltage across the motor armature and resistor 22 in series is increasing. When this voltage is decreasing however, most of the discharge current of condenser 68 flows through the relatively low forward resistance of varistor 70 so that the voltage drop across this portion of the circuit comprising varistor 70 in parallel with the path comprising resistors 66 and 67 is relatively small. Condenser 72 filters the electromotive force impressed upon the control electrode-cathode path of tube 41. Condenser 71 and resistor 69 filter extraneous frequencies in the armature circuit.

During starting and reversal of motor 10, both of which occur frequently in the course of normal operation, the motor armature is deprived of counter electromotive force and accordingly would draw excessive current if some limiting means were not provided. For usual values of armature current, the voltage drop across resistor 22 is low and current flows in a circuit comprising resistors 56, 63, 67, 66 and 22 and varistor 57 in the reverse or high resistance direction of the varistor 57, resistors 66 and 67 in series being shunted by varistor 70. For this direction of current flow the voltage drop across varistor 57 is high relative to that across resistor 22 so that the voltage drop across the resistor 22 does not appreciably affect the resultant control voltage across leads a and b. When the armature current of motor 10 rises to a sufficiently high value however, due to the counter electromotive force of motor 10 being reduced to zero, the voltage drop across resistor 22 becomes sufficiently high to cause a current reversal in the circuit just described. Since the current then flows through varistor 57 in its forward or low resistance direction, the voltage drop across varistor 57 is low with respect to that across resistor 22. Thus during the brief periods when no counter electromotive force is being generated in the armature of motor 10, the control voltage across leads a and b is essentially the voltage drop across resistor 22 and this control voltage controls the rectifier 20, 21 through the control circuit comprising tube 41 and the phase shifting circuit to limit the amplitude of the motor armature current.

The motor 10 is provided with a field winding 75 shunted by a resistor 76 of 1,250 ohms which reduces the effective inductance of the circuit for energizing the field winding. Current from transformer winding 24 is rectified by a single wave rectifier comprising a gas-filled, three-electrode rectifier tube 77 and the rectified current is supplied to the field winding 75 for causing the motor 10 to rotate in a certain direction. A single wave rectifier comprising a similar rectifier tube 78 supplies rectified current which flows in the opposite direction through field winding 75 of motor 10. When the input shaft 14 is displaced with respect to the output shaft 12, one only of the rectifier tubes 77 and 78 is conditioned for supplying rectified current to winding 75, this being determined by the direction of displacement of shaft 14. The current supply path for rectifier tube 77 may be traced from the tube cathode to the upper terminal of transformer winding 24 and from the lower terminal of winding 24 through motor field winding 75 and through an inductance coil 79 to the anode. A 0.01-microfarad condenser 80 is provided in a path connecting a terminal of inductance coil 79 to the cathode. The current supply path for rectifier tube 78 may be traced from its cathode through motor field winding 75 to the lower terminal of transformer winding 24 and from the upper terminal of winding 24 through inductance coil 81 to the anode. A 0.01-microfarad condenser 82 is provided in a path connecting a terminal of coil 81 to the cathode. The control electrode-cathode circuit of tube 77 may be traced from the control electrode through 47,000-ohm resistor 83, secondary transformer winding 60, asymmetrically conducting varistor 84 and secondary transformer winding 53 to the cathode, there being connected across the portion of the circuit comprising varistor 84 and transformer winding 53 in series a 1-microfarad condenser 85 and in shunt therewith a 0.1-megohm resistor 86. A 0.0068-microfarad condenser 87 is provided in a path connecting the control grid and cathode. A similar control electrode-cathode circuit for tube 78 may be traced from the control grid through 47,000-ohm resistor 88, secondary transformer winding 59, asymmetrically conducting varistor 89 and secondary transformer winding 52 to the cathode, there being connected across the portion of the circuit comprising varistor 89 and transformer winding 52 in series a 1-microfarad condenser 90 shunted by a 0.1-megohm resistor 91. A 0.0068-microfarad condenser 92 is provided in a path connecting the control grid and cathode.

It will be seen that, due to the rectifying action of varistors 84 and 89, condensers 85 and 90, respectively, are charged to set up biasing voltages for preventing conduction of space currents in tubes 77 and 78 when no voltage is induced in transformer windings 59 and 60, that is, when the error signal is zero. When the input shaft 14 is displaced in one direction relative to the output shaft 12 there is produced during each half cycle in which the anode of tube 77 is positive with respect to the cathode a voltage across transformer winding 60 which opposes the biasing voltage across condenser 85 and thereby causes the tube to conduct space current during substantially the entire half cycle of the anode voltage when the anode is positive relative to the cathode. When the direction of displacement of shaft 14 relative to shaft 12 is reversed to cause a phase reversal of the error signal, the phase of the voltage induced in transformer winding 60 is reversed so that this voltage is of the same polarity as the biasing voltage across condenser 85 when the anode of tube 77 is positive relative to the cathode, thereby preventing space current conduction in tube 77. Under this condition, however, the voltage induced in secondary transformer winding 59 opposes the biasing voltage across condenser 90 when the anode of tube 78 is positive relative to its cathode so that tube 78 passes space current during each half cycle when its anode is positive relative to the cathode. The motor field winding 75 is thus energized by current in such a direction as to cause a displacement of output shaft 12 in a direction corresponding to the direction of the displacement of the input shaft 14.

Fig. 2 shows a modification of the portion of Fig. 1 which is enclosed by a broken line A, B, D, F. The elements of Fig. 2 corresponding to those of Fig. 1 bear the same designations. In Fig. 2 the lead $a$ is connected to the cathodes of tubes 20 and 21 as in Fig. 1. However, in Fig. 2 the lead $b$ is connected through resistor 37 to the control grid of tube 20 and through resistor 38 to the control grid of tube 21, the tube 41 and its associated circuit elements and the phase shifting circuit of Fig. 1 being omitted from Fig. 2. A resistor 95 of 0.47 megohm is provided in a path connecting leads $a$ and $b$.

In Fig. 1, when the input shaft 14 is displaced, current will be supplied from rectifier 20, 21 to the armature of motor 10 and current will be suplied to the motor field winding 75 from rectifier 77, if the rotation of shaft 14 is in one direction, and from rectifier 78 if the shaft 14 is displaced in the opposite direction. Thus the direction of the current flow in winding 75 and therefore the direction of rotation of the output shaft 12 is controlled in accordance with the direction of rotation of the input shaft 14. The amplitude of the current supplied to the motor armature is controlled to control the motor torque in response to an electromotive force having several components, as described above, set up across the leads $a$ and $b$, lead $a$ being connected to the cathode of tube 41 and lead $b$ being connected to the control electrodes through resistors 42 and 43, respectively. An increase of the control electromotive force applied to the control electrode-cathode circuit of tube 41, due to a decrease in amplitude of the error signal for example, causes a reduction of the anode-cathode current flowing in transformer windings 33 and 34, the impedance of winding 32 being increased. The phase of the voltages across resistors 35 and 36 which are impressed upon the grid-cathode circuits of rectifier tubes 20, and 21, respectively, is thus shifted in a direction to increase the phase difference between the anode-cathode voltages and the grid-cathode voltages of tubes 20 and 21. Each of the tubes thus fires later during each half cycle when the anode is positive with respect to the cathode, thereby decreasing the current supplied to the motor armature. As depicted in Fig. 2, the control voltage may be applied directly to the control electrode-cathode circuits of rectifier tubes 20 and 21. In this case an increase of the control voltage across leads $a$ and $b$ makes the control grids of tubes 20 and 21 relatively more negative with respect to the cathode potential and, as a result, a higher anode potential is required to cause the flow of space current in the tubes. Each of the tubes thus fires later in each positive half cycle of the anode-cathode voltage, thereby causing the current supplied to the motor armature to be reduced.

Fig. 3 shows a modification of the portion of Fig. 1 enclosed by the broken line G, C, D, E. In Fig. 3 there is employed, instead of the tube 41 and its associated circuit elements of Fig. 1, an indirectly heated thermistor 96 having a heater winding 97 to which current is supplied through leads $a$ and $b$. Thermistors are made from a class of materials known as semiconductors which have relatively large negative coefficients of resistance. They are described in an article by G. L. Pearson on page 106, et seq. of "Bell Laboratories Record" for December 1940. In this modification the rectifier 54, 55 and the connections therefrom to the terminals of resistor 56 are omitted so that, as the error signal increases, the control voltage applied to leads $a$ and $b$ increases to cause a reduction of the resistance of the thermistor. As a result, increased current flows through the winding 33 and the impedance of winding 32 decreases. The phase of the voltages across resistors 35 and 36 is thus shifted in a direction to cause increased current to be supplied from rectifier 20, 21 to the motor armature. Due to the time required for the thermistor temperature to change, the control of the rectifier 20, 21 is delayed somewhat but, in a given system, this time constant can be made small compared to the inertia of the moving elements so that it will have no perceptible slowing effect on the response of the moving elements to the error signal. If desired, as a further modification, transformer 32, 33 may be omitted and the thermistor connected directly in the phase shift bridge circuit in place of winding 32, the heater element, as before being connected to leads $a$ and $b$. When so modified, a condenser should be connected across resistor 31.

What is claimed is:

1. In combination, a space discharge device having an anode, a cathode and a control electrode, a space current circuit connecting said anode and said cathode including a current source, a circuit connecting said control electrode and said cathode and means responsive to change of space current in said device for setting up in said control electrode-cathode circuit a voltage for relatively greatly reducing the rate of change of space current when the space current is changing in one direction and for relatively slightly reducing the rate of change of space current when the space current is changing in the opposite direction.

2. In combination, a space discharge device having an anode, a cathode and a control electrode, a circuit connecting said anode and said cathode including a current source and a resistor, a circuit connecting said control electrode and said cathode including a plurality of parallel branch paths, means for setting up in a first of said paths a voltage which may vary over a range of values between fixed limits for controlling the space current of said device flowing in said anode-cathode circuit, an asymmetrically conducting element having resistance to current flowing therethrough in one direction many times greater than its resistance to current flow therethrough in the opposite direction, a second of said paths comprising in series said resistor and said asymmetrically conducting element, the voltage set up across said resistor when the space current flowing therethrough exceeds a certain value causing the resistance of said asymmetrically conducting element to change from a high to a relatively low value in response to a reversal of the current flow therethrough to cause to be impressed upon said control electrode with respect to said cathode a potential for limiting the space current of said device.

3. In combination, means for supplying unidirectional current from a current source to a load, means for deriving from the voltage across the load an electromotive force proportional to the rate of change of load voltage for load voltage changes in one direction, the amplitude of said electromotive force being larger for a load voltage change in said one direction than for a load voltage change at an equal rate in the opposite direction, and control means under control of said derived voltage for controlling the current supplied to the load to reduce the rate of change of load voltage to a greater extent when the load voltage is changing in said one direction than when the load voltage is changing in said opposite direction.

4. A combination in accordance with claim 3 in which said means for deriving an electromotive force from the load voltage comprises a shunt current path connected across said load, said shunt path comprising ohmic resistance and capacitance in series and an asymmetrically-conducting device connected across said ohmic resistance, said derived electromotive force being set up across said resistance and said asymmetrically conducting element in parallel.

5. A combination in accordance with claim 3 in which said control means comprises a space current device having an anode, a cathode and a control electrode, a first circuit connecting said anode and said cathode, said first circuit comprising said load, and a second circuit including said derived electromotive force connecting said control electrode and said cathode.

6. In combination, means for supplying unidirectional current from a current source to a load including a resistor through which said current flows, means for controlling the current supplied to said load from said source comprising a space current device having an anode, a cathode and a control electrode, the current supplied to the load being controlled in accordance with the anode-cathode resistance of said device, a circuit having two parallel branch paths connecting said control electrode and said cathode, means for setting up in a first of said branch paths a control voltage which may vary over a range of values between fixed limits for controlling the anode-cathode resistance of said device and an asymmetrically conducting element, said second branch path comprising said resistor and said asymmetrically conducting element, the voltage set up across said resistor when the current flowing therethrough exceeds a certain value causing the resistance of said asymmetrically conducting element to change from a high to a relatively low value, thereby causing to be impressed upon said control electrode-cathode circuit a voltage for controlling the anode-cathode resistance of said device to limit the current supplied to said load.

7. In combination, a current supply circuit for supplying current from a source to a motor for controlling the displacement of an output shaft driven by the motor in response to displacement of an input shaft, means for setting up a control voltage having a first component proportional to the relative displacement of said shafts and a second component proportional to the rate of change of said relative displacement, means for setting up and introducing into said voltage a third component proportional to the rate of increase of voltage across said current supply circuit, said third voltage component being opposed to said first and second voltage components, and means responsive to said control voltage for controlling the supply of current from said source to said motor.

8. A combination in accordance with claim 7 in which there is provided means effective only when the current supplied to said motor exceeds a predetermined amplitude for modifying said control voltage to limit said current to a certain maximum value irrespective of the amplitudes of said first, second and third voltage components.

9. The combination with a motor and a supply circuit for supplying unidirectional current thereto to produce displacement of an output shaft coupled to said motor, of an input shaft which may be rotated about its axis, means for setting up a voltage having a first component which is proportional to the relative displacement of said input and output shafts and a second component proportional to the rate of change of said relative displacement, means for setting up a second voltage proportional to the rate of change of voltage across said motor and means responsive to said first and second voltages for controlling the current supplied to said motor.

10. The combination with a motor having an armature and a field winding, a first current supply means for supplying unidirectional current to said armature, a second current supply means for supplying to said field winding current flowing in one direction therethrough, a third current supply means for supplying to said field winding current flowing in the opposite direction therethrough, an input shaft, an output shaft driven by said motor, each of said current supply means being inoperative to supply energizing current to said motor when there is no relative displacement of said shafts, means responsive to relative displacement of said shafts for setting up a control voltage for controlling the amplitude of the current supplied to said armature, said control voltage having a first component proportional to the relative displacement of said shafts, a second component proportional to the rate of change of said relative displacement and a third component proportional to the rate of change of voltage across said armature, means responsive to a relative displacement of said shafts in one direction for controlling said second current supply means to render it operative for supplying current in one direction to said field winding and means responsive to a relative displacement of said shafts in the opposite direction for controlling the third current supply means to render it operative for supplying current in the opposite direction to said field winding, thereby controlling the speed and direction of rotation of said motor.

11. In combination, a rectifier comprising a first space current device having an anode, a cathode and a control electrode for rectifying current from an alternating current supply source and for supplying the rectified current to a load, a second space current device having an anode, a cathode and a control electrode, a circuit comprising a transformer having a primary and a secondary winding for supplying current from said supply source to the anode-cathode path of said second space current device, the secondary winding of said transformer being connected in the anode-cathode circuit of said second space current device, means for deriving from said circuit a voltage the phase of which varies in accordance with change of inductance of said primary winding, means for impressing said derived voltage upon the control electrode-cathode circuit of said first space current device to control the current supplied to the load and means for controlling the space current in said second space-current device to control the inductance of said primary winding.

12. In combination with means for supplying unidirectional current from a current source to a load, of a space current device having an anode, a cathode and a control electrode and means for controlling the potential of said control electrode with respect to the cathode potential for controlling the space current in said device and thereby the current supplied to said load, said means comprising a current path connected across said load, said path comprising a first resistor and a condenser in series, an asymmetrically-conducting device connected across said first resistor, a second and third resistor, a condenser connected across said third resistor, a source of variable unidirectional control voltage, a circuit comprising said source of control voltage, said second resistor and said third resistor in series and a circuit connecting said control electrode and said cathode comprising said first and second resistors in series.

13. A combination in accordance with claim 12 in which said asymmetrically conducting element is so poled that the discharge current of said condenser flows through said element in its forward or relatively low resistance direction in response to a reduction of voltage across said load.

14. In combination with a supply circuit for supplying unidirectional current from a source to a load, of a first resistor in series in said supply circuit through which the load current flows, a space current device having an anode, a cathode and a control electrode and means for controlling the potential of said control electrode with respect to the cathode potential for controlling the space current in said device and thereby the current supplied to the load, said means comprising a current path connected across the portion of said supply circuit comprising said first resistor and said load, said current path comprising a second resistor and a condenser in series, a first asymmetrically conducting element connected across said second resistor, a third and fourth resistor, a condenser connected across said fourth resistor, a source of variable unidirectional control voltage, a circuit comprising said source of control voltage said third resistor and said fourth resistor in series, a first circuit connecting said control electrode and said cathode comprising said second and third resistors in series, a second asymmetrically conducting element, and a second circuit connecting said control electrode and said cathode comprising said first resistor and said second asymmetrically conducting element in series.

JAMES A. POTTER.

REFERENCES CITED

The following references are of record in the file of this patent:

UNITED STATES PATENTS

| Number | Name | Date |
| --- | --- | --- |
| 1,995,404 | Stoller | Mar. 26, 1935 |
| 2,083,382 | Jutson et al. | June 8, 1937 |
| 2,147,674 | Satterlee | Feb. 21, 1939 |
| 2,181,568 | Kotowski et al. | Nov. 28, 1939 |
| 2,406,856 | Satterlee | Sept. 3, 1946 |
| 2,409,970 | Agins | Oct. 22, 1946 |
| 2,414,449 | Chapin | Jan. 21, 1947 |